(12) United States Patent
Ducret

(10) Patent No.: US 9,088,144 B2
(45) Date of Patent: Jul. 21, 2015

(54) ARMOR CLAMPING AND CUTTING TOOL

(76) Inventor: Lucien Ducret, Stamford, CA (US)

( * ) Notice: Subject to any disclaimer, the term of this patent is extended or adjusted under 35 U.S.C. 154(b) by 415 days.

(21) Appl. No.: 12/929,266

(22) Filed: Jan. 12, 2011

(65) Prior Publication Data

US 2012/0174411 A1    Jul. 12, 2012

(51) Int. Cl.
*H02G 1/12*    (2006.01)

(52) U.S. Cl.
CPC ........... *H02G 1/1297* (2013.01); *H02G 1/1217* (2013.01)

(58) Field of Classification Search
CPC . H02G 1/1297; H02G 1/1212; H02G 1/1229; H02G 1/1217
USPC ....... 30/90.1–91.2; 269/3, 6, 254 CS; 29/238, 29/243.55; 81/9.41, 9.42, 9.43
See application file for complete search history.

(56) References Cited

U.S. PATENT DOCUMENTS

| | | | | |
|---|---|---|---|---|
| 4,359,819 A * | 11/1982 | Ducret | ........................... | 30/90.3 |
| 4,437,237 A * | 3/1984 | Ducret | ........................... | 30/90.2 |
| 4,769,909 A * | 9/1988 | Ducret | ........................... | 30/90.3 |
| 4,884,339 A * | 12/1989 | Custin | ........................... | 30/90.4 |
| 4,896,909 A * | 1/1990 | Mauer | ..................... | 292/341.16 |
| 4,977,671 A * | 12/1990 | Ducret | ........................... | 30/90.2 |
| 8,191,266 B2 * | 6/2012 | Ducret | ........................... | 30/90.4 |
| 2005/0066528 A1 * | 3/2005 | Ducret | ........................... | 30/90.2 |
| 2006/0021482 A1 * | 2/2006 | Ducret | ............................. | 83/13 |
| 2006/0021483 A1 * | 2/2006 | Ducret | ............................. | 83/13 |

* cited by examiner

*Primary Examiner* — Laura M Lee
(74) *Attorney, Agent, or Firm* — Y. Kakshov, Esq.

(57) ABSTRACT

A tool for clamping and cutting an armor of a cable is configured with a housing extending along a longitudinal axis and configured to receive the cable, an elongated lever having a distal end pivotally coupled to a distal end of the housing; an elongated spring having a proximal end, which is riveted to the proximal end of the housing, and a distal end which terminates at a distance from the distal ends, a clamping stud coupled to the distal end of the spring. The elongated spring and the lever are configured to have a controllably slidable contact point therebetween. A torque applied to the lever translates into a spring-bending force applied to the spring and sufficient to bring the stud in contact with the armor with a clamping force depending on the location of the point of contact and smaller than the spring-bending force.

9 Claims, 5 Drawing Sheets

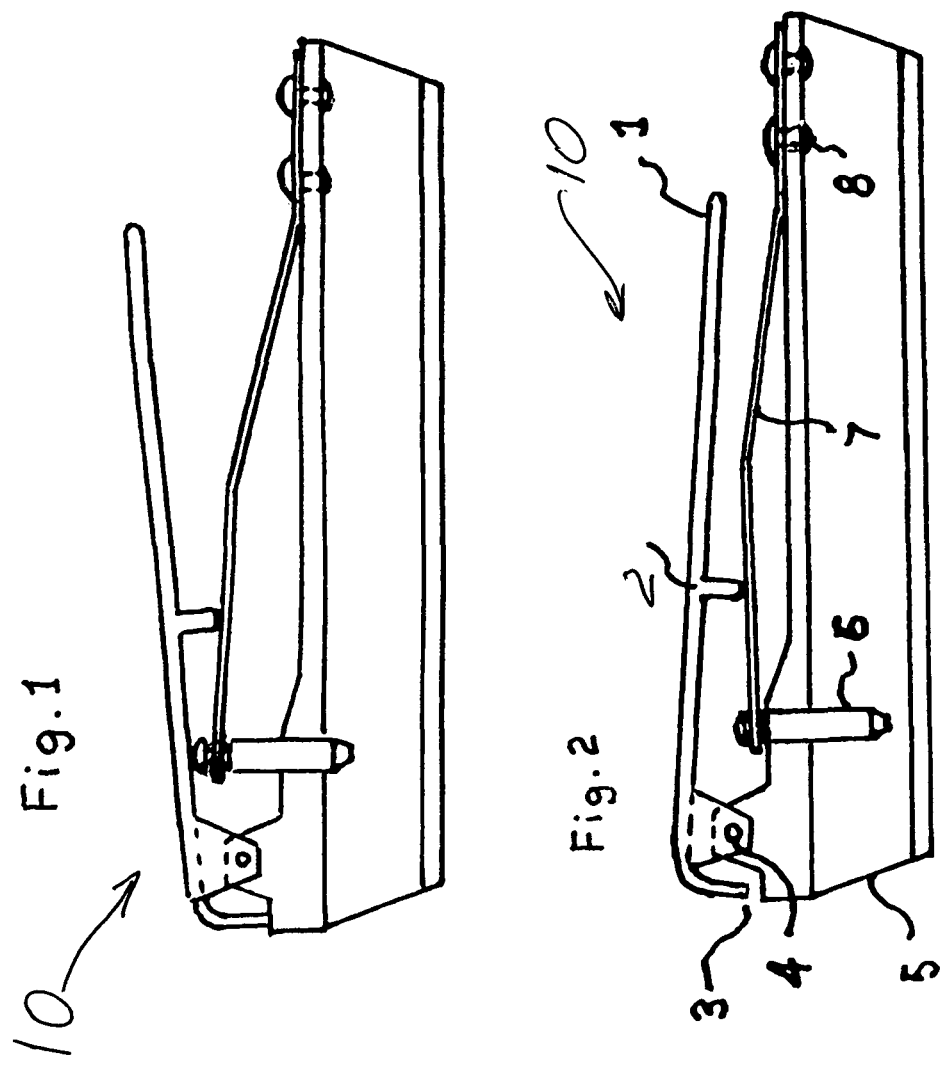

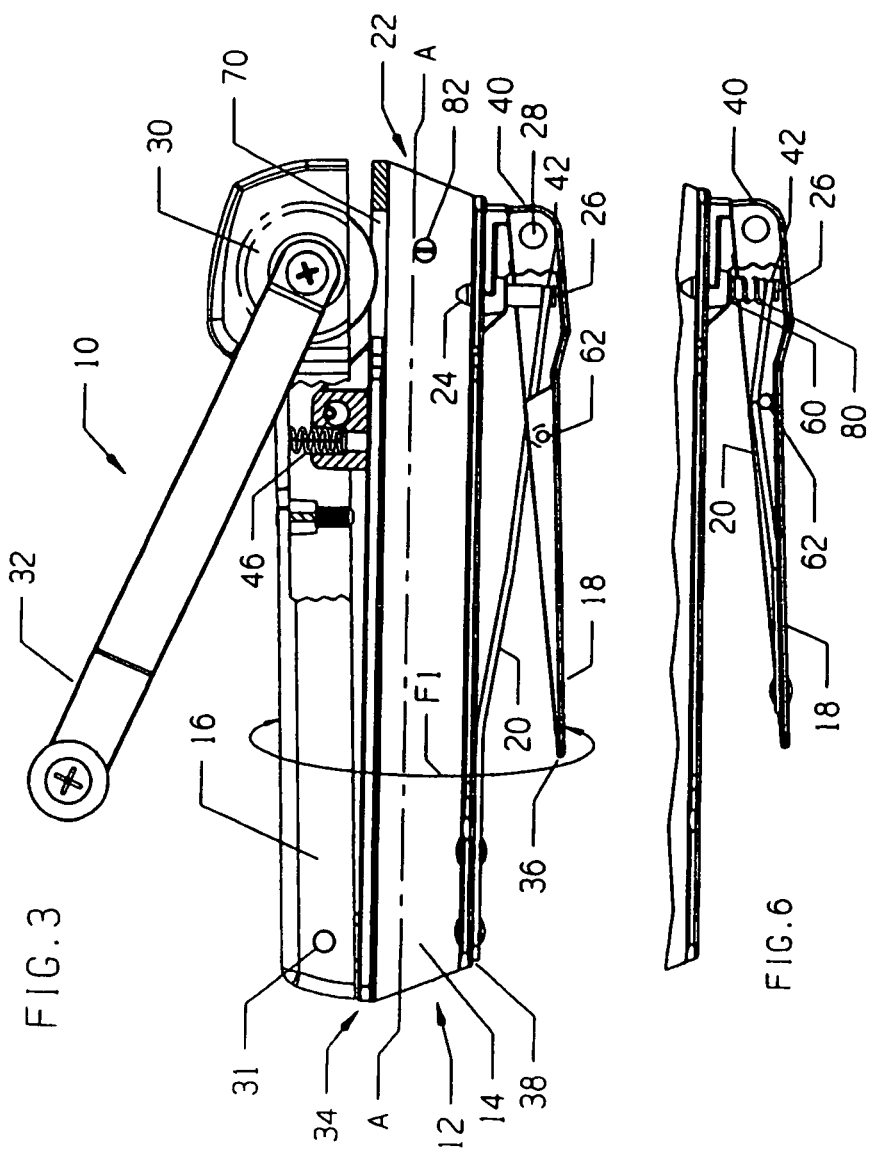

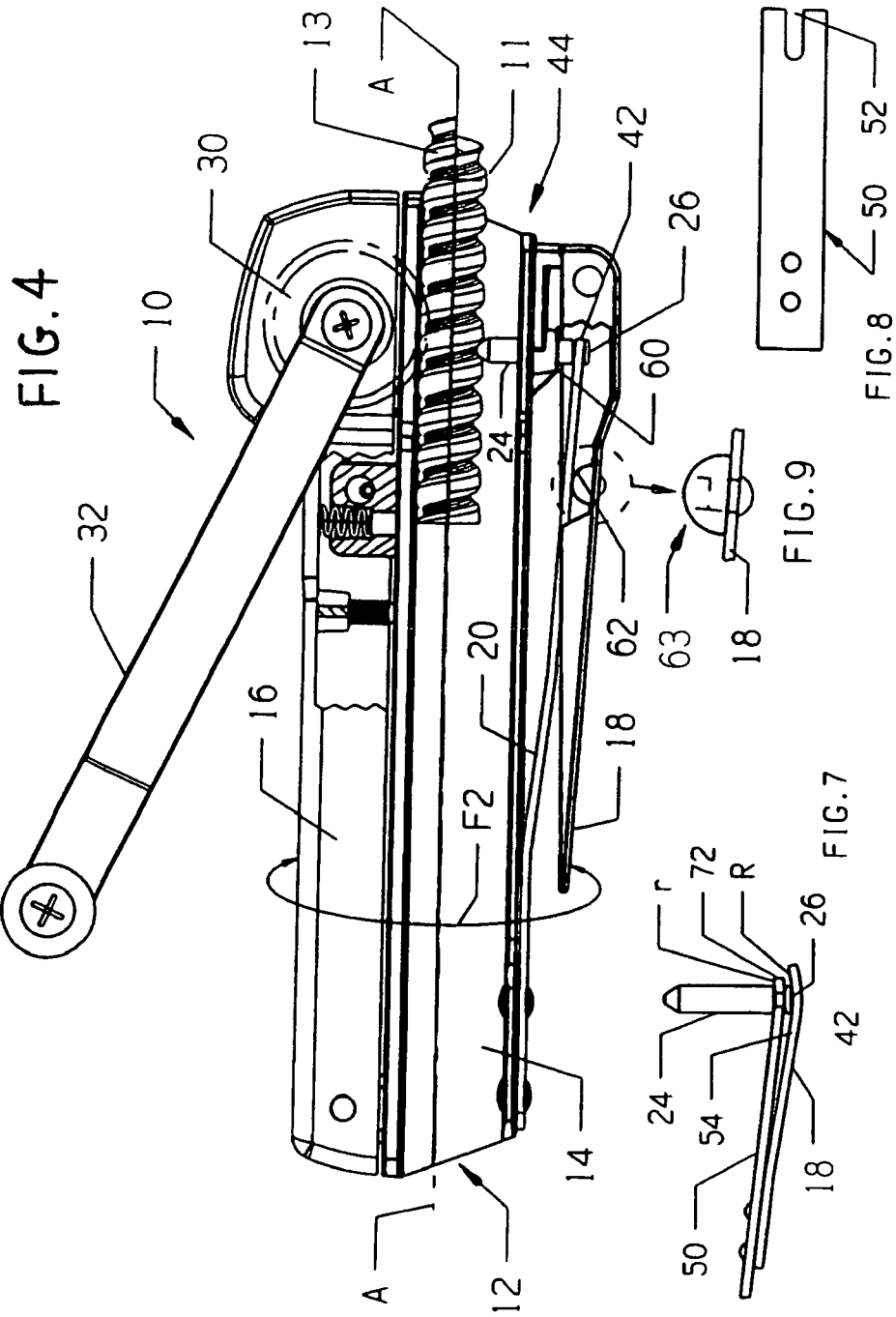

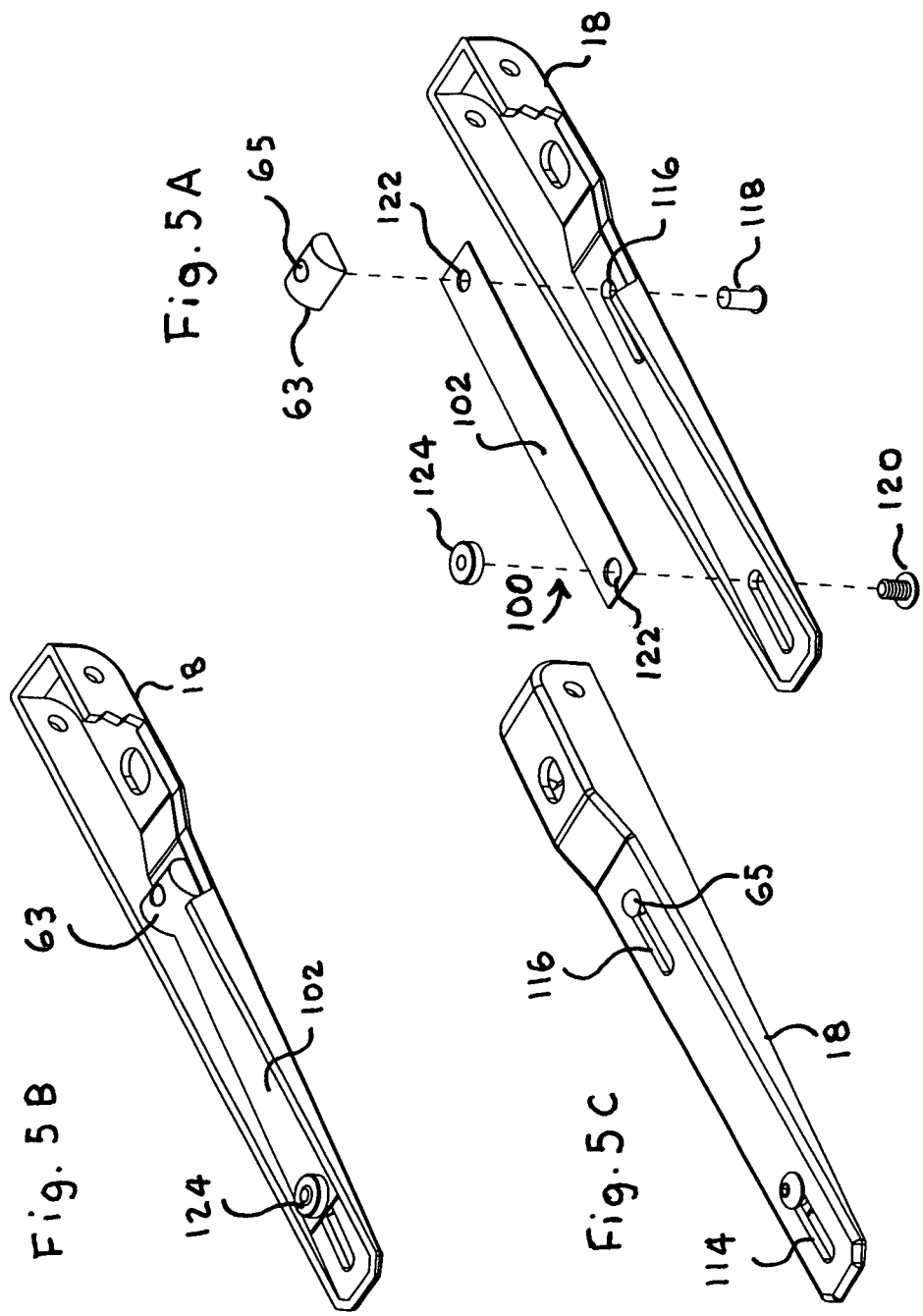

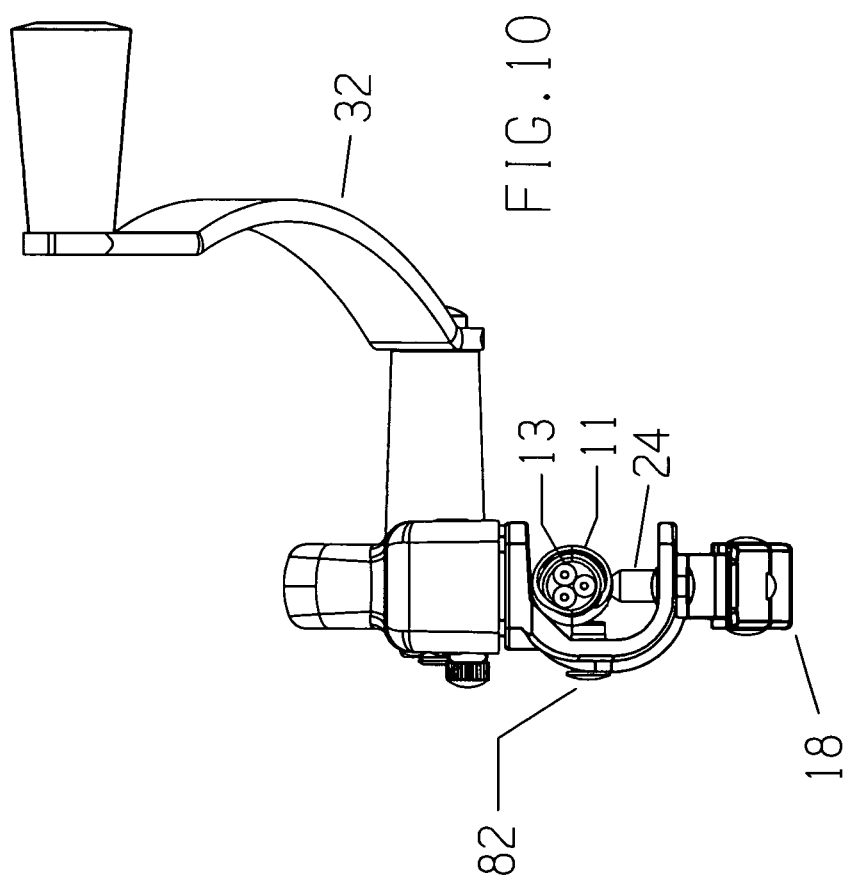

ARMOR CLAMPING AND CUTTING TOOL

BACKGROUND OF THE INVENTION

1. Field of the Invention

This invention relates to hand-held tools for cutting armors of cables.

2. Discussion of the Prior Art

Hand-held tools for removing armored casings are well known and disclosed in detail in U.S. Pat. No. 4,896,909 ("'909"); U.S. Pat. No. 4,359,819 ("'819"); and US Application Publication 20060021483 ("'483") co-owned with the present application and fully incorporated herein by reference.

The patents '909 and '819 disclose hand-held tool operating so that the pivotal motion of a lever translates in the linear motion of a clamping stud which registers the cable to be cut in the desired position. The structure disclosed in the patents includes two pivotally coupled levers and a stud mounted on one of the levers. When the user applies a torque bringing the levers towards one another, the stud moves linearly to engage the cable to be cut with a force that can be controlled only by the applied force. The latter may be great enough to crush the armor of the cable.

A need therefore exists for a force controller operative to controllably alter the force applied a clamping stud.

BRIEF DESCRIPTION OF THE DRAWINGS

This need is satisfied by the disclosed tool disclosed in detail hereinbelow in light of the following drawings, in which:

FIGS. 1 and 2 illustrate the principle of operation of the disclosed tool;

FIG. 3 is a side elevation of the inventive tool shown in an initial loading position, in which a small length of cable is received in a cable channel, parts being broken away;

FIG. 4 is a side elevation of the inventive tool shown in a clamping position, in which a small length of cable is clamped;

FIGS. 5A, 5B and 5C are respective top, bottom and exploded views of the force controlling mechanism;

FIG. 6 represents a side elevation of a portion of a housing and a lever system in accordance with another embodiment of the invention;

FIG. 7 represents a detailed view of one of the embodiments of the lever system;

FIG. 8 represents an end portion of a retainer of the lever system shown in FIG. 7;

FIG. 9 is an elevational view of the projection provided between the spring and lever; and FIG. 10 represents a detailed view of a formation configured to actuate one of the lever system components in response to applying an external force to the other component of the lever system.

SPECIFIC DESCRIPTION

Reference will now be made in detail to several embodiments of the invention that are illustrated in the accompanying drawings. Wherever possible, same or similar reference numerals are used in the drawings and the description to refer to the same or like parts or steps. The words "connect," "couple," and similar terms with their inflectional morphemes may denote direct and immediate connections, but also include connections through mediate elements or devices.

FIGS. 3 and 4 illustrate a tool 10 configured with a channel 22, which is shaped and dimensioned to selectively receive differently sized elongated armored cables. In operation, after an armored cable 11 (FIG. 4) is placed in channel 22 (FIG. 3), the user applies a force to a hand-held lever 18 and actuates a force applicator. The latter includes a leaf spring 20 extending between a housing 12 and lever 18, a clamping stud 24 displaceable substantially perpendicular to a longitudinal axis A-A into channel 22 and arresting the displacement of cable 11 and a force controller 100 (FIG. 5A). The saw handle 32 actuates a blade 30 accomplishing a longitudinal cut of armor 13.

In operation, after placing the armored cable in the channel 22, the user holds a housing 12 and lever 18 applying to these components an torque sufficient to displace the lever from a rest position of FIG. 3 to a clamping position, illustrated in FIG. 4. As the lever 18 moves towards the clamping position, a clamping stud 24 is displaced toward and urges against an armor 13 of cable 11 with a clamping force sufficient to firmly hold armor 13 between the clamp stud 24 and the supporting surface of the channel 22.

After reliably securing armored cable 11 in channel 22 in the clamping position, the user applies an additional compressive force displacing a housing member 16 relative to lever 18 and causing circular saw 30 to advance towards and penetrate the armored casing 13. Actuation of a saw handle 32 results in an axial cut of the armor 13.

Turning now to details of tool 10, lever 18 has a distant end 40 pivotally attached to a distal end 44 (FIG. 4) of housing 12. As a result, lever 18 is operative to pivot about a pin 28 (FIG. 3) between the rest and clamping positions. In the rest position, lever 18 extends angularly outwards relative to longitudinal axis A-A and has its proximal end 36 spaced from the housing 12. Mounted to freely pivot about pin 28, lever 18 pivots to the clamping position displacing thus the proximal end 36 towards the housing 12.

FIGS. 1 and 2 illustrate a principle of operation of the disclosed tool 10. The tool 10 includes traditional levers or handles 1 and 5 pivotally coupled to one another so that lever 1 is displaced in response to the application of the user applied torque. However it is not the lever that actuates a stud 6, but a resilient member 7 that has one end riveted to lever 5 and the other end to rivet 6.

In contrast to the tool disclosed in the above-mentioned patents, the forces acting on stud 6 are different. The tool is configured with lever 1 having a b length, for example 5" and has a projection 2 acting on element 7 and spaced from pivot 4 at a distance a, such as 1.5". The length of element 7 is a b' and, for instance, equal to 5" and the distance between the stud and pivot 4 is 0.5".

Unlike in the prior art patents, projection 2 does not act on a point of contact between stud 6 and element 7, but on a region further removed from pivot 4. When the torque is applied, projection 2 actuates element 7, but the force acting on stud 6 is considerably reduced because the point of contact for all practical purposes becomes a pivot point which obviously the force distribution as disclosed below.

Assuming that a 10 lbs torque Q1 is applied to lever 1, the force P1 acting on element 7 at the point of contact between projection 2 and element 7 can be determined as $P1=Q1 \cdot b/a=50/1.5=33.3$.

The leaf spring 20, coupled to the housing 12 by its proximal end 38 (FIG. 3), is configured to resist the lever handle's displacement to the clamping position. As lever 18 moves toward the clamping position of the armor, it exerts a spring-bending force applied to spring 20. Applying the torque or initial compression force F1, sufficient to overcome the springing force of spring 20, brings lever 18 and spring 20 in contact at a contact point which eventually displaces the distal end of spring 20 and stud 24 towards armor 13, as illustrated in FIG. 4. Due to the configuration of the housing 12 and spring 20, preferably, lever 18 extends substantially parallel to the longitudinal axis A-A in the clamping position. However, various configurations can be easily implemented so as to position lever 18 at an angle relative to the longitudinal axis in the clamping position.

The spring 20 has a longitudinal body extending angularly outwards from the housing 12 and terminating in the vicinity of distal end 40 of lever 18. A distal end 42 (FIG. 4) of the spring 20 is substantially aligned with a rotation axis of circular saw 30 in a plane extending transversely the longitudinal axis A-A. Made from metal or engineering plastics, spring 20 is sufficiently resilient to support lever 18 in the rest position.

The stroke of clamping stud 24 is self-adjusting depending on the outer diameter of the cable 11. Once the cable 11 is reliably locked, the clamping operation is completed, and armor 13 is ready to be cut.

Displacement of clamping stud 24 is a result of torque F1 (FIG. 3) which, when applied to lever 18, translates into the spring-bending force of spring 20. The latter bends about a contact point 62 (better seen in FIG. 9), which is practically a pivot point for spring 20, and solely affects the clamping force applied to stud 26. As proximal end 36 of lever 18 continues its displacement towards housing 12, distal end 42 of the spring 20 actuates stud 24 to move into channel 22. The clamping stud 24 is preloaded on distal end 42 by a spring 80 shown in FIG. 6.

The force distribution has been disclosed in detail hereinabove. Suffice it to say that the clamping force acting on stud 24 and, therefore, armor 13 of cable 11 is not damaging to the latter. The stroke of stud 24 is also substantially smaller than in the known tools and the stud itself does not need to be additionally adjusted in order to clamp cable 11 regardless of the outer diameter of the latter.

Referring to FIGS. 5A-5C in addition to FIGS. 3 and 4, force controlling mechanism 100 includes a plate 102 mounted in a U-shaped trough of lever 18 and a projection 63. The force acting on stud 24 can be adjusted by controllably changing contact point 62 at which projection 63 contacts spring 20. The further point 62 from stud 24, the smaller the force applied to the stud.

The configuration of mechanism 100 provides for such an adjustment by having plate 102 along with projection 63 controllably slide relative to lever 18 and spring 20. The realization of the adjustment includes forming spaced longitudinal slots 114 and 116, respectively, in lever 18 and openings or holes 122 at respective opposite ends of plate 102. The position of the slots and openings/holes in lever 18 can be reversed. In the position of plate 102 associated with a maximally possible force applied to stud 24, openings 122 of plate 102 are located close to respective distal ends of the slots as shown in FIG. 5A so as to reduce the distance between the pivot point and stud 26. As the user slides plate 102 towards the proximal ends of respective slots, the force applied to stud 24 (FIG. 3) decreases. The projection 63 is also provided with a channel 65 aligned with opening 122 and slot 116 all traversed by a shoulder rivet 118 which may engage the inner screw of channel 65 or simply press fit thereinto. The other slot 114 and holes 122 are traversed by an adjustment locking screw 120.

Referring to FIG. 6, a distal end 42 of spring 20 has an opening traversed by a head 26 of clamping stud 24. To facilitate coupling between clamping stud 24 and lever 20, its body may have a narrow or recessed neck located immediately next to head 26. Thus, as the neck of stud 24 is received within the opening of the lever 18, the head 26 is terminates under spring 20 at a distance from lever 18. As can be seen in this figure, the proximal end of spring 20 is riveted to the proximal end of lever 18 at an axial distance from its distal end.

Alternatively, as shown in FIGS. 7 and 8, tool 10 includes a retainer 50 configured to engage the neck of head 26 of clamping stud 24. Coupled to a distal portion of an inner side 54 (FIG. 7) of lever 18, retainer 50 is made from resilient material and configured to press head 26 of clamping stud 24 against side 54 of the lever. Note that distal end 42 of spring 20 may be curved with a radius of curvature "R" slightly smaller than a radius of curvature "r" of the retainer 50. Such a configuration allows the edge of retainer 50 to close a gap between the latter and distal ends of spring 20 preventing thus inadvertent disengagement of stud's head 26 from a recess 52 (FIG. 8). Furthermore, increasing the initial compression force, which is necessary for further cutting of armor 13, as explained below, causes a distal edge 72 of retainer 50 to press against and bends lever's distal end 42 outwards.

The projection 63 may have various forms and dimensions. It may be configured as a roller. FIG. 9, in turn, illustrates a half-moon shoe structure having its apex pressed against the spring 20.

The compression spring 80 (FIG. 6) may be braced between the underside of the stud's head 26 and the stop 60 or directly the housing 12. The spring 80 is so selected that its module of resilience is lower than the module of a resilient element 46 (FIG. 3), which biases multiple housing members away from one another. The spring 80, similarly to spring 20, is configured to generate a force directed in a direction opposite to the initial force applied to lever 18.

Referring again to FIGS. 3 and 4, housing 12 extends along longitudinal axis A-A between a proximal end 34 (FIG. 3) and the distal end 44 (FIG. 4) and includes two housing members 14 and 16. Respective proximal ends of housing members 14, 16 are pivotally connected to one another by a hinge 31. Displacement of these housing members causes circular saw 30 to advance through a slot 70 (FIG. 3), which is aligned with clamping stud 24, towards the cutting plane.

Housed in one of members 14, 16 is a resilient element 46 (FIG. 3) having resiliency module higher than spring 20. Accordingly, the initial force F1 applied to tool 10 for displacing its components to the clamping position of FIG. 4 may be insufficient to overcome the spring force of element 46. Only upon applying the additional compressive force F2, which exceeds the spring force of element 46 (FIG. 3), housing members 14, 16 are forced to pivot towards one another to the cutting position. The resilient element 46 includes, but of course, not limited to, a compressive spring. Preferably, housing members 14, 16 diverge from the proximal end 34 of housing 12 from one another. Responding to the additional force F2, the housing members are displaced towards and extend substantially parallel to one another and to lever 18 in the cutting position of the tool.

Referring to FIGS. 3 and 10 push button 82 housed in channel 22 shifts armored cables with relatively small diameters on the center of the circumference of circular saw 30.

This document describes the inventive sound transfer methods and devices implementing these methods for illustration purposes only. Neither the specific embodiments of the invention as a whole, nor those of its features limit the general principles underlying the invention. In particular, the invention is not limited to a cable-cutting tool, but includes various clamping devices operating in accordance with the inventive principle. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

The invention claimed is:

1. A tool for preparation of an armor of a cable, comprising:
   a housing extending along a longitudinal axis and configured to receive the cable;
   an elongated lever having a distal end pivotally coupled to a distal end of the housing;
   an elongated spring having a proximal end and a distal end which terminates at an axial distance from the distal end of the lever, the proximal end of the elongated spring being riveted to the housing at an axial distance from the distal end of the elongated spring;
   a clamping stud coupled to the distal end of the elongated spring, wherein the torque applied to the elongated lever translates into a spring-bending force of the elongated spring so that the clamping stud urges against the armor with a clamping force;
   a plate operable to axially slide along a bottom of the elongated lever relative to the elongated spring; and
   a formation attached to the plate and moveable therewith to axially slide upon and urge against the elongated spring so as to adjust the spring-bending forces.

2. The tool of claim 1, wherein the formation includes a roller or half-moon shoe shape provided with an apex, which lies on the spring or the lever.

3. A tool for preparation of an armor of a cable, comprising:
   a housing extending along a longitudinal axis an configured to receive the cable;
   an elongated lever having a distal end pivotally coupled to a distal end of the housing;
   an elongated spring having a proximal end and a distal end which is spaced axially from the proximal end, the proximal end of the elongated spring being coupled to the housing, and the distal end of the elongated spring terminating at a distance from the distal end of the elongated lever and being coupled thereto;
   a clamping stud coupled to the distal end of the spring, wherein a torque applied to the elongated lever translates into a spring-bending force of the elongated spring so that the clamping stud urged against the armor with a clamping force;
   a plate operable to axially slide along a bottom of the elongated lever relative to the spring between one extreme position, in which the spring-bending force applied to the stud by the elongated spring is maximal, and another extreme position in which the spring-bending force is minimal, wherein the extreme positions define a range of a contact point between the formation and elongated spring within which the clamping force remains invariably smaller than the force-bending force.

4. The tool of claim 3, wherein the elongated spring is formed with a bent portion extending between the proximal and distal ends thereof and configured so that the distal end of the elongated lever is spaced from the housing.

5. The tool of claim 3, wherein the clamping stud traverses the distal end of the spring and has a head terminating between the distal ends of respective spring and lever and fixed to the elongated lever.

6. The tool of claim 3, wherein the housing includes a first and second member each having a respective proximal and free distal end, the proximal ends of the first and second members being pivotally coupled to one another so that the first and second members diverge from one another in the clamping position of the elongated lever handle and move towards one another to extend substantially parallel to the longitudinal axis in response to a second external force co-directed with but grater than the initial external force.

7. The tool of claim 6, wherein the respective distal end of the first member has a longitudinal slot opening into a longitudinal channel provided in the housing for receiving the cable, the slot being aligned with the clamping stud.

8. The tool of claim 7, wherein the second member houses a circular saw extending through the elongated slot to cut an armored casing of the armored cable upon applying the second external force to the first and second members of the housing.

9. The tool of claim 8, further comprising a resilient member extending transversely to the longitudinal axis between the first and second members and configured to generate a spring force biasing the first and second members apart and yielding to a second external force so as to move the first and second members to a cutting position, in which the first and second members extend substantially parallel to one another.

* * * * *